US008423242B2

(12) United States Patent
Ochiai et al.

(10) Patent No.: US 8,423,242 B2
(45) Date of Patent: Apr. 16, 2013

(54) POWER-SAVING SYSTEM AND CONTROL METHOD FOR THE SAME

(75) Inventors: Yuichi Ochiai, Toyota (JP); Takamitsu Suzuki, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/386,176

(22) PCT Filed: Jun. 30, 2010

(86) PCT No.: PCT/IB2010/001591
§ 371 (c)(1),
(2), (4) Date: Jan. 20, 2012

(87) PCT Pub. No.: WO2011/010197
PCT Pub. Date: Jan. 27, 2011

(65) Prior Publication Data
US 2012/0123639 A1 May 17, 2012

(30) Foreign Application Priority Data
Jul. 21, 2009 (JP) ................. 2009-170567

(51) Int. Cl.
*G06F 7/00* (2006.01)
(52) U.S. Cl.
USPC .................. 701/36; 700/295; 702/61
(58) Field of Classification Search .......... 701/22, 701/36; 700/295; 702/61
See application file for complete search history.

(56) References Cited

U.S. PATENT DOCUMENTS 7,002,265 B2 * 2/2006 Potega .................. 307/149
7,080,267 B2 * 7/2006 Gary et al. ................. 713/300
7,757,105 B2 * 7/2010 Okazaki .................... 713/300
8,255,090 B2 * 8/2012 Frader-Thompson et al. ...................... 700/295

(Continued)

FOREIGN PATENT DOCUMENTS

EP 0 392 411 A2 10/1990
EP 1 129 892 A1 9/2001

(Continued)

OTHER PUBLICATIONS

International Preliminary Report on Patentability for corresponding International Patent Application No. PCT/IB2010/001591 dated Dec. 14, 2011.

(Continued)

*Primary Examiner* — Russell Frejd
(74) *Attorney, Agent, or Firm* — Sughrue Mion, PLLC (57) ABSTRACT

In a vehicle equipped with a plurality of electronic devices, a power-saving system (100) saves electricity while comprehensively controlling the power supply status to each of the plurality of electronic devices. The power-saving system (100) includes: power supply status control portion (11) controlling the power supply status to each of the plurality of electronic devices depending on a usage situation of the vehicle; and usage situation determination portion (10) determining the usage situation on the basis of information useful for determining a usage situation, including information related to a usage date and time, current location or driver of the vehicle. The power supply status control portion (11) controls the power supply status to each of the plurality of electronic devices on the basis of a predetermined power supply status to each of the plurality of electronic devices set depending on a usage situation and the usage situation determined by the usage situation determination portion (10).

6 Claims, 8 Drawing Sheets

U.S. PATENT DOCUMENTS

| | | | |
|---|---|---|---|
| 8,323,087 B2 * | 12/2012 | Chen et al. | 463/19 |
| 2005/0228553 A1 * | 10/2005 | Tryon | 701/22 |
| 2008/0070652 A1 * | 3/2008 | Nguyen et al. | 463/1 |
| 2010/0076615 A1 * | 3/2010 | Daniel et al. | 700/293 |
| 2010/0270933 A1 * | 10/2010 | Chemel et al. | 315/130 |
| 2012/0005505 A1 * | 1/2012 | Tolia et al. | 713/320 |

FOREIGN PATENT DOCUMENTS

| | | |
|---|---|---|
| JP | 2000-215100 A | 8/2000 |
| JP | 2004-171553 A | 6/2004 |
| JP | 2006-236532 A | 9/2006 |
| JP | 2006-330843 A | 12/2006 |

OTHER PUBLICATIONS

International Search Report and Written Opinion for corresponding International Patent Application No. PCT/IB2010/001591 mailed Sep. 13, 2010.

* cited by examiner

FIG. 2

| ELECTRONIC DEVICE / FUNCTION | DISPLAY | SPEAKER | AUDIO UNIT | COMMUNICATION MODULE | ETC CARD READER | IMAGE SENSOR | DISTANCE SENSOR |
|---|---|---|---|---|---|---|---|
| ROUTE GUIDANCE | O | O | – | – | – | – | – |
| RADIO | – | O | O | – | – | – | – |
| VICS | O | O | O | – | – | – | – |
| INFORMATION SEARCH | O | – | – | O | – | – | – |
| ETC | – | O | – | O | O | – | – |
| INATTENTIVE DRIVE PREVENTION ASSIST | – | O | – | – | – | O | – |
| CRUISE CONTROL ASSIST | – | O | – | – | – | – | O |

| FUNCTION \ USAGE SITUATION | ROUTE GUIDANCE | RADIO | VICS | INFORMATION SEARCH | ETC | INATTENTIVE DRIVE PREVENTION ASSIST | CRUISE CONTROL ASSIST |
|---|---|---|---|---|---|---|---|
| COMMUTE | – | – | O | – | – | – | – |
| BUSINESS | O | – | – | – | O | – | – |
| RECREATION | – | – | O | O | – | – | – |
| TRIP | O | O | – | – | O | O | O |
| UNDEFINED | O | O | O | O | O | O | O |

| USAGE SITUATION \ ELECTRONIC DEVICE | DISPLAY | SPEAKER | AUDIO UNIT | COMMUNICATION MODULE | ETC CARD READER | IMAGE SENSOR | DISTANCE SENSOR |
|---|---|---|---|---|---|---|---|
| COMMUTE | O | O | O | — | — | — | — |
| BUSINESS | O | O | — | O | O | — | — |
| RECREATION | O | O | O | — | — | — | — |
| TRIP | O | O | O | O | O | O | O |
| UNDEFINED | O | O | O | O | O | O | O |

F I G . 5

| USAGE SITUATION | USE OF ROUTE GUIDANCE | USE OF RADIO | USE OF VICS | USE OF INFORMATION SEARCH | USE OF ETC | USE OF INATTENTIVE DRIVE PREVENTION ASSIST | USE OF CRUISE CONTROL ASSIST |
|---|---|---|---|---|---|---|---|
| COMMUTE | 0 | 0 | 10 | 0 | 0 | 0 | 0 |
| BUSINESS | 100 | 0 | 20 | 0 | 30 | 80 | 30 |
| COMMUTE | 0 | 50 | 10 | 30 | 0 | 0 | 0 |
| RECREATION | 0 | 0 | 0 | 10 | 0 | 0 | 0 |
| UNDEFINED | 100 | 80 | 30 | 30 | 30 | 100 | 30 |
| COMMUTE | 0 | 50 | 0 | 30 | 0 | 0 | 0 |

POWER-SAVING SYSTEM AND CONTROL METHOD FOR THE SAME

BACKGROUND OF THE INVENTION

1. Field of the Invention

The invention relates to a power-saving system that saves electricity while comprehensively controlling power supplied to each of a plurality of electronic devices equipped for an integrated system and, more particularly, to an in-vehicle power-saving system and a control method for the same, which save electricity while controlling the power supply status to each of the plurality of in-vehicle electronic devices depending on a usage situation of the integrated system.

2. Description of the Related Art

Japanese Patent Application Publication No. 2006-330843 (JP-A-2006-330843) describes an image input-output apparatus that has multiple functions, such as a printer, a scanner and a facsimile. The image input-output apparatus stops supply of power in order of increasing frequency of usage to thereby achieve energy savings.

In addition, Japanese Patent Application Publication No. 2000-215100 (JP-A-2000-215100) describes an apparatus that controls power supplied to each of a plurality of areas in a storage device and that stops supply of power to an area of which the frequency of usage is low to thereby achieve energy savings.

In addition, Japanese Patent Application Publication No. 2006-236532 (JP-A-2006-236532) describes an apparatus that controls power supplied to a plurality of AV devices, such as a DVD drive, a hard disk drive, a tuner, a ghost reduction circuit, and a LAN adapter, and that stops supply of power to AV devices that are not operated for a predetermined period of time to thereby achieve energy savings.

In addition, Japanese Patent Application Publication No. 2004-171553 (JP-A-2004-171553) describes a battery-powered ETC in-vehicle electronic device having a normal mode and a low power consumption mode. The ETC in-vehicle electronic device includes a wake-up circuit unit that switches the low power consumption mode to the normal mode, and supplies power to only the wake-up circuit unit in the low power consumption mode to thereby achieve energy savings. The ETC in-vehicle electronic device additionally stops supply of power to the wake-up circuit unit to further achieve energy savings when the ETC in-vehicle electronic device recognizes that a shift range is set at any one of "P (parking)", "N (neutral)" and "R (reverse)", when no toll road is included in a recommended route searched by a navigation system, or when no ETC gate is present around a current location of a host vehicle even when a toll road is included in the recommended route. In such conditions, the vehicle is stopped or travelling backward or no ETC gate is present. Therefore, it is not necessary for the ETC in-vehicle electronic device to shift into the normal mode, and it is not necessary for the wake-up circuit unit to monitor a situation.

However, any apparatuses described in JP-A-2006-330843, JP-A-2000-215100 and JP-A-2006-236532 just passively control a method of supplying power on the basis of the frequency of usage or state of usage of each power supply target for a long period of time and cannot handle a case where the use of each of power supply targets discretely changes.

In addition, the ETC in-vehicle electronic device described in JP-A-2004-171553 controls only power supplied to the ETC in-vehicle electronic device itself, and is able to handle only limited and fixed conditions, such as when the shift range is set at "P (parking)", "N (neutral)" or "R (reverse)" or when the navigation system outputs a recommended route. This also limits the energy-saving effect.

SUMMARY OF THE INVENTION

The invention provides a power-saving system and a control method for the same, which save electricity while flexibly handling a case where the use of each of a plurality of power supply targets discretely changes.

A first aspect of the invention relates to a power-saving system. The power-saving system saves electricity while comprehensively controlling the power supply status to each of a plurality of electronic devices equipped for an integrated system. The power-saving system includes: a power supply status control portion that controls the power supply status to each of the plurality of electronic devices depending on a usage situation of the integrated system; and a usage situation determination portion that determines the usage situation of the integrated system on the basis of information related to the use of the integrated system, including information related to a usage date and time, current location or user of the integrated system, wherein the power supply status control portion controls the power supply status to each of the plurality of electronic devices on the basis of a predetermined power supply status to each of the plurality of electronic devices set depending on the usage situation of the integrated system and the usage situation determined for each the usage situation determination portion.

The power-saving system may further include: a power supply status recording portion that monitors the power supply status to each of the plurality of electronic devices, and that records the power supply status to each of the plurality of electronic devices by usage situations determined by the usage situation determination portion; and a power supply status learning portion that derives the use of each of the plurality of electronic devices in each usage situation on the basis of the power supply status recorded by the power supply status recording portion, and that updates the predetermined power supply status to each of the plurality of electronic devices set for each the usage situations on the basis of the use of the integrated system.

In addition, in the power-saving system, the power supply status learning portion may set the power supply status to the electronic device of which the utilization rate is low to the power supply status corresponding to a power-saving mode in which power consumption is saved.

In the power-saving mode, operation of the electronic device of which the utilization rate is low may be suspended, while being on standby so as to be able to start up quickly when operation of the electronic device of which the utilization rate is low is required.

A second aspect of the invention relates to a control method for a power-saving system. The power-saving system saves electricity while comprehensively controlling the power supply status to each of a plurality of electronic devices equipped for an integrated system. The control method for the power-saving system includes: controlling the power supply status to each of the plurality of electronic devices depending on a usage situation of the integrated system; and determining the usage situation of the integrated system on the basis of information related to the use of the integrated system, including information related to a usage date and time, current location or user of the integrated system. The controlling the power supply status to each of the plurality of electronic devices on the basis of a predetermined power supply status to each of the plurality of electronic devices set depending on a usage situation and the determined usage situation.

With the above described configuration, it is possible to provide a power-saving system and a control method for the same, which save electricity while flexibly handling a case where the use of each of a plurality of power supply targets discretely changes.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
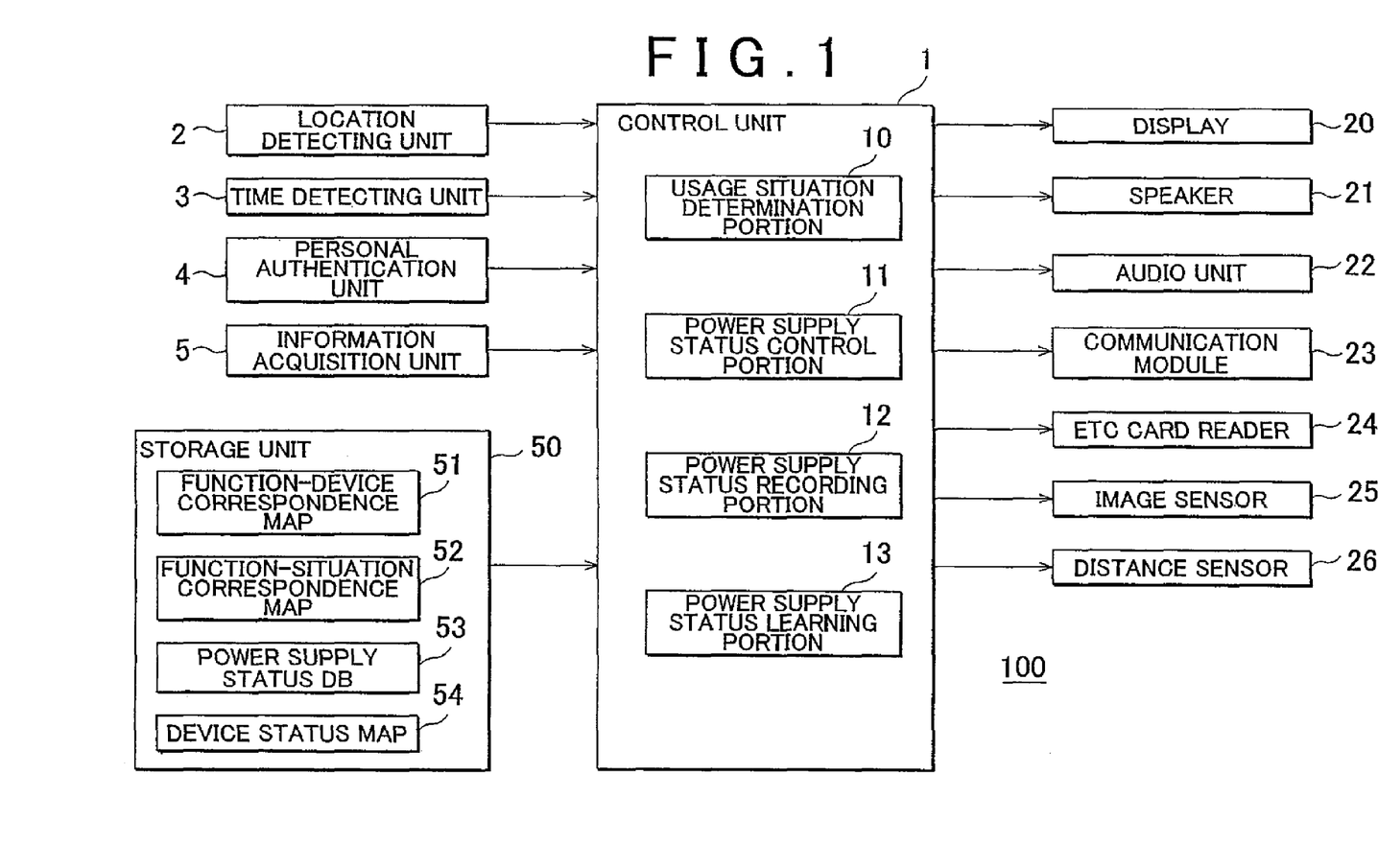
FIG. 1 is a block diagram that shows an example of the configuration of a power-saving system according to an embodiment of the invention.

FIG. 1 is a block diagram that shows an example of the configuration of a power-saving system according to an embodiment of the invention. The power-saving system 100 is used in an integrated system formed of a plurality of electronic devices mounted on a vehicle. The power-saving system 100 saves electricity on the basis of the knowledge that in-vehicle electronic devices used by a user (for example, a driver) of the vehicle are biased depending on a usage situation of the vehicle.

Here, the "usage situation of the vehicle" means a situation in which the vehicle is used, and, for example, includes a situation that the vehicle is used for commute, a situation that the vehicle is used for business, a situation that the vehicle is used for a recreation, a situation that the vehicle is used for a trip (a situation that the vehicle is driven in an unacquainted place), and the like.

In addition, an example, in which in-vehicle electronic devices used by the driver are biased depending on a usage situation of the vehicle, includes a fact that the driver does not use a route guidance function when the vehicle is used for commute, a fact that the driver does not use an audio function when the vehicle is used for business, and the like.

As shown in FIG. 1, the power-saving system 100 includes a control unit 1. The control unit 1 controls power supplied to a display 20, a speaker 21, an audio unit 22, a communication module 23, an ETC card reader 24, an image sensor 25, a distance sensor 26, and the like (hereinafter, referred to as "various in-vehicle electronic devices").

The control unit 1 is a computer that includes a central processing unit (CPU), a random access memory (RAM), a read only memory (ROM), and the like. The control unit 1 stores programs in the ROM. These programs respectively correspond to a usage situation determination portion 10, a power supply status control portion 11, a power supply status recording portion 12 and a power supply status learning portion 13. The control unit 1 causes the CPU to execute processes corresponding to the respective portions.

In addition, the control unit 1 receives outputs from a location detecting unit 2, a time detecting unit 3, a personal authentication unit 4 and an information acquisition unit 5. The control unit 1 executes the processes corresponding to the above described portions while referring to a storage unit 50, and then outputs control signals for controlling the power supply status to the various in-vehicle electronic devices.

The location detecting unit 2 is used to measure a current location. The location detecting unit 2, for example, receives a GPS signal by a global positioning system (GPS) receiver and then measures a vehicle location (latitude, longitude and altitude) on the basis of the received signal.

The time detecting unit 3 is used to measure a current time. The time detecting unit 3 is, for example, a timer incorporated in the control unit 1.

The personal authentication unit 4 is used to identify a user of the integrated system (a driver of the vehicle). The personal authentication unit 4 may, for example, carry out biometric authentication, such as fingerprint authentication and iris authentication, may authenticate a driver by reading an IC card, an electronic key, or the like, carried by the driver, or may authenticate a driver on the basis of a password input by the driver through a touch panel, a microphone or a remote controller. In addition, the personal authentication unit 4 may authenticate a driver on the basis of the driving operation characteristic of the driver, such as braking operation and accelerator operation.

The information acquisition unit 5 is used to acquire various pieces of information related to the use of each of the various in-vehicle electronic devices or the use of the integrated system (vehicle). The information acquisition unit 5, for example, includes a touch panel, a microphone, a remote controller, a vehicle interior camera, and a navigation system. The touch panel, the microphone or the remote controller accepts an input of the user of the integrated system. The vehicle interior camera detects the behavior (for example, line of sight) of the user of the integrated system. The navigation system holds the location of a destination or the name of a facility.

The display 20 is, for example, a liquid crystal display that is installed in an instrument panel. The display 20 displays route guidance information output from the navigation system, an operation screen for operating the audio unit 22, alarm information output from various devices, and the like.

The speaker 21 is, for example, an in-vehicle speaker that is installed around a driver seat. The speaker 21 outputs, by audio, route guidance information output from the navigation system, various pieces of audio information output from the audio unit 22, alarm information output from various devices.

The audio unit 22 is, for example, a multi-AV device that includes a CD drive, an AM/FM tuner, a VICS information receiving unit, and the like. The audio unit 22 outputs an audio signal to the speaker 21.

The communication module 23 is used to control communication between the vehicle and an external device. The communication module 23 is, for example, able to receive weather information, traffic jam information, traffic regulation information, and the like, transmitted from a base station or a roadside device and to transmit various pieces of information to an ETC gate or a communication center using a cellular phone frequency or a specified low power radio frequency.

The ETC card reader 24 is installed in the cabin in order to read information stored in an ETC card. The ETC card reader 24 reads the information stored in the ETC card and then outputs the read information to the communication module 23 to thereby make it possible to transfer the information, stored in the ETC card, to the ETC gate.

The image sensor 25 is a vehicle interior camera that is installed in the cabin in order to record a driver. The image sensor 25 detects the line of sight and the degree of opening of the eyes of the driver to determine whether or not the driver is looking aside or sleeping. When the driver is looking aside or sleeping, the image sensor 25 issues warning to make it possible to prevent the driver from looking aside or sleeping.

The distance sensor 26 is used to measure a distance between the host vehicle and an object around the host vehicle. The distance sensor 26, for example, causes an ultrasonic wave, laser light or a radio wave (for example, a millimeter wave) emitted therefrom to reflect on an object (for example, a preceding vehicle), which is a measurement target, and then receives the reflected wave. The distance sensor 26 compares the transmitted wave with the received wave to measure a distance between the host vehicle and the preceding vehicle on the basis of the phase difference between the transmitted wave and the received wave.

Any of the above described various in-vehicle electronic devices operates on power supplied from an in-vehicle battery or a generator, and has at least two power modes. The two power modes include a normal mode and a power-saving mode. In the normal mode, the in-vehicle electronic device operates on a rated power. In the power-saving mode, operation of the in-vehicle electronic device is suspended to suppress power consumption while being on standby so as to be able to start up quickly when the operation of that in-vehicle electronic device is required. Note that the power-saving mode may be a mode in which power consumption is suppressed while limited operation is continued.

The storage unit 50 is used to store various pieces of information. The storage unit 50 is, for example, a storage medium, such as a hard disk and a flash memory. The storage unit 50 stores a function-device correspondence map 51, a function-situation correspondence map 52, a power supply status database 53 (hereinafter, referred to as "power supply status DB 53") and a device status map 54.

Figure 2:
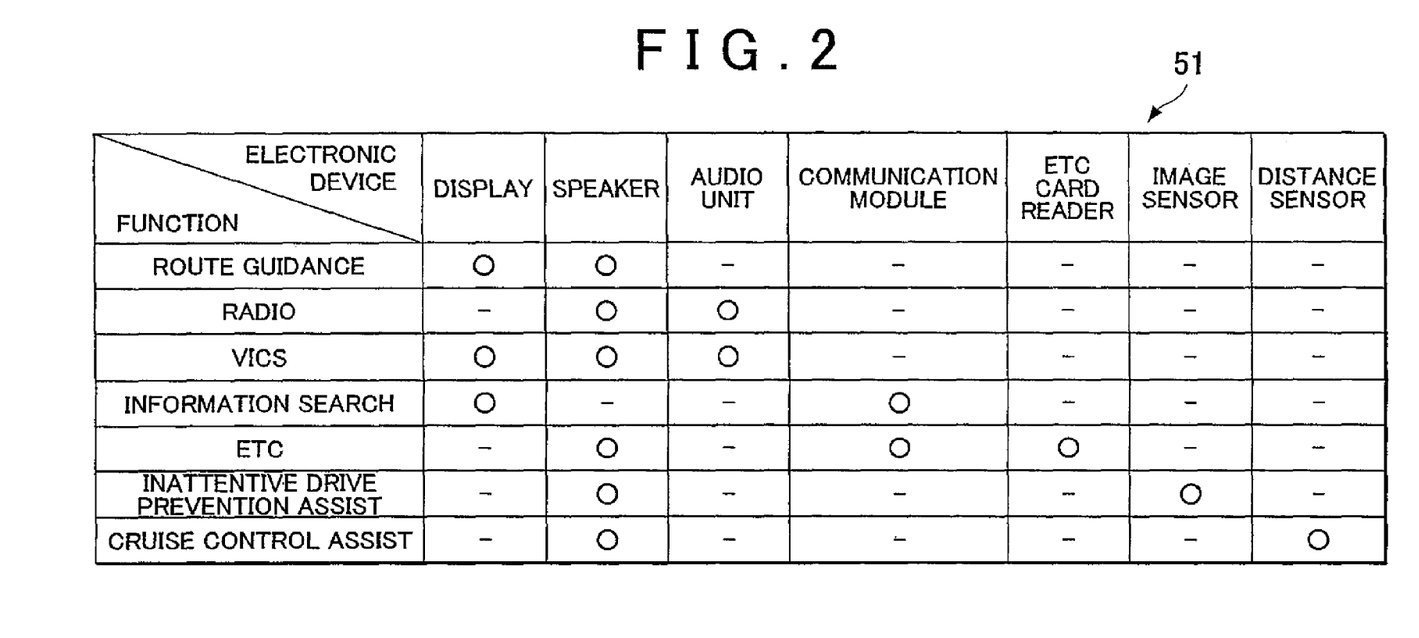
FIG. 2 is a view that shows an example of a function-device correspondence map.

The function-device correspondence map 51 is a map that represents the correspondence relationship between a function provided by the integrated system and a combination of various in-vehicle electronic devices required for implementing the function. The function-device correspondence map 51 is stored in advance at the time of shipment of the vehicle and cannot be changed as a rule.

FIG. 2 is a view that shows an example of the function-device correspondence map 51. In FIG. 2, function names "route guidance", "radio", "VICS", "information search", "ETC", "inattentive drive prevention assist" and "cruise control assist" are given in columns, and the above described various in-vehicle electronic devices are given in rows. Note that the value "O" in the map means that the corresponding in-vehicle electronic device is set in the normal mode, and the value "-" in the map means that the corresponding in-vehicle electronic device is set in the power-saving mode. In addition, the "information search" function is a function that acquires various pieces of information, such as karaoke data, through bidirectional communication between the vehicle and an external device.

The function-device correspondence map 51 shown in FIG. 2, for example, indicates that the display 20 and the speaker 21 need to operate in order to implement "route guidance" function and the speaker 21 and the image sensor 25 need to operate in order to implement "inattentive drive prevention assist" function.

Figure 3:
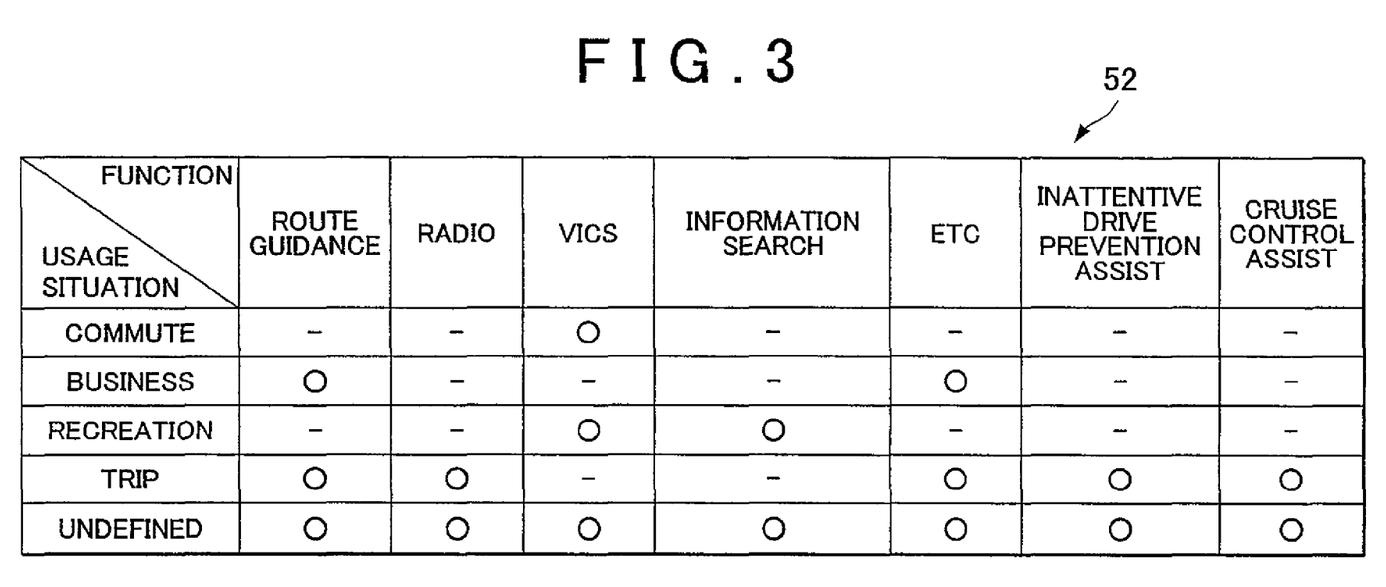
FIG. 3 is a view that shows an example of a function-situation correspondence map.

The function-situation correspondence map 52 is a map that shows the correspondence relationship between a vehicle usage situation and a function used in each usage situation. The function-situation correspondence map 52 may be updated by power supply status learning portion 13, which will be described later, and stores predetermined initial values at the time of shipment of the vehicle.

FIG. 3 is a view that shows an example of the function-situation correspondence map 52. In FIG. 3, usage situations "commute", "business", "recreation", "trip" and "undefined" are given in columns, and the various functions shown in FIG. 2 are given in rows. Note that the value "O" in the map means that the corresponding function is set in an operation state, and the value "-" in the map means that the corresponding function is set in a non-operation state or in a limited operation state.

The function-situation correspondence map 52 shown in FIG. 3, for example, indicates that only the "VICS" function is set in an operation state in the usage situation "commute", and the "route guidance", "radio", "ETC", "inattentive drive prevention assist" and "cruise control assist" functions are set in an operation state in the usage situation "trip". Note that the usage situation "undefined" is applied to a usage situation that does not apply to the existing usage situation "commute", "business", "recreation" or "trip", and, in the present embodiment, all the functions of the integrated system are set in an operation state in the usage situation "undefined".

In addition, the function-situation correspondence map 52 may be configured to add or delete a usage situation.

Figure 4:
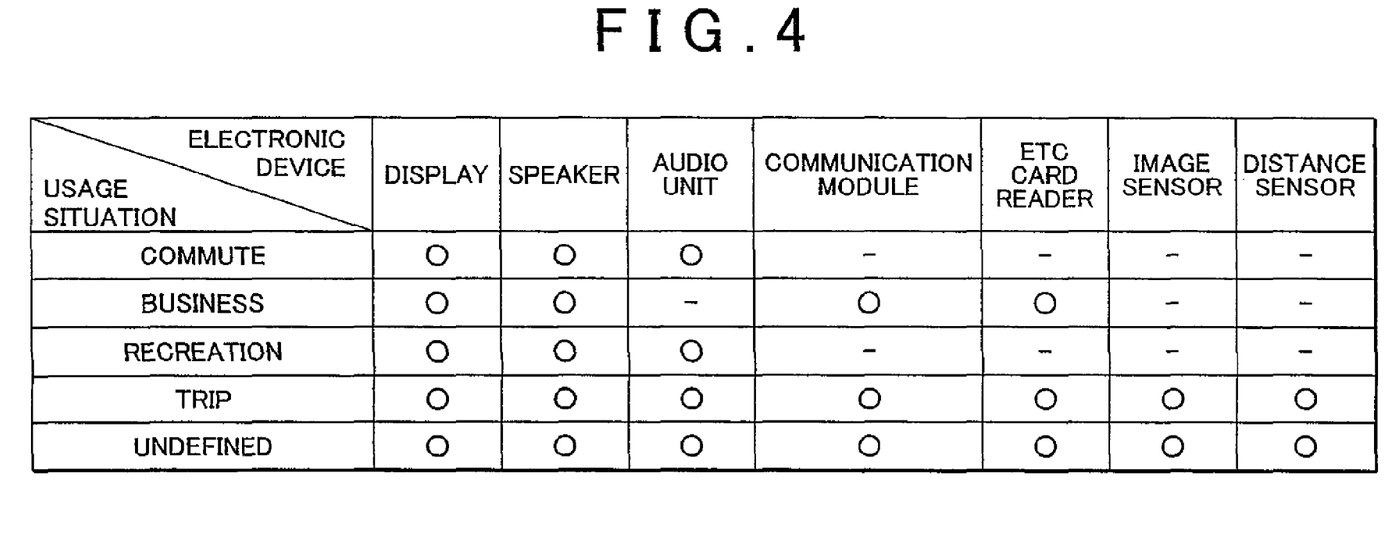
FIG. 4 is a view that shows an example of a situation-device correspondence map.

FIG. 4 is a situation-device correspondence map that shows the correspondence relationship between a vehicle usage situation and various in-vehicle electronic devices required for implementing the functions used in the usage situation. The situation-device correspondence map is, for example, generated by combining the function-device correspondence map 51 shown in FIG. 2 and the function-situation correspondence map 52 shown in FIG. 3 at a predetermined timing (for example, when the vehicle starts traveling). Note that the value "O" in the situation-device correspondence map means that the corresponding in-vehicle electronic device is set in the normal mode, and the value "-" in the situation-device correspondence map means that the corresponding in-vehicle electronic device is set in the power-saving mode.

The situation-device correspondence map shown in FIG. 4, for example, indicates that the display 20, the speaker 21 and the audio unit 22 need to be set in the normal mode in the usage situation "commute" and all the various in-vehicle electronic devices need to be set in the normal mode in the usage situation "trip".

Note that the power-saving system 100 may store the situation-device correspondence map that combines the function-device correspondence map 51 with the function-situation correspondence map 52 as shown in FIG. 4 in the storage unit 50 instead of storing the function-device correspondence map 51 and the function-situation correspondence map 52 in the storage unit 50; however, it is rather convenient when the function-device correspondence map 51 and the function-situation correspondence map 52 are separately provided in terms of controlling power supply status by functions implemented by a combination of the plurality of electronic devices.

Figure 5:
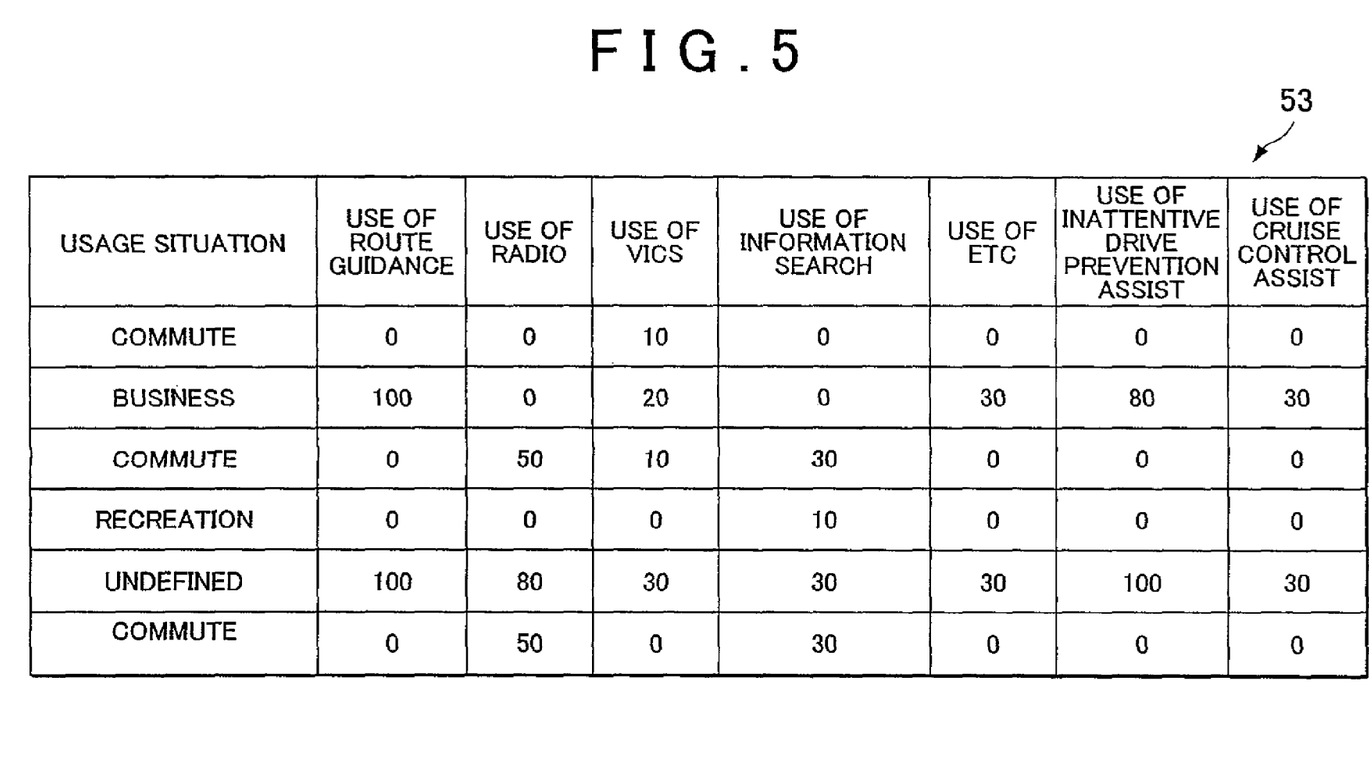
FIG. 5 is a view that shows an example of a power supply status database.

The power supply status DB 53 is a database that systematically and searchably stores the use of each of various functions monitored by usage situations of the vehicle. The power supply status DB 53 allows the control unit 1 of the power-saving system 100 to analyze the use of each of various functions by usage situations at a predetermined timing.

FIG. 5 is a view that shows an example of the power supply status DB 53. Each record of the power supply status DB 53 is constituted of fields "usage situation", "use of route guidance", "use of radio", "use of VICS", "use of information search", "use of ETC", "use of inattentive drive prevention assist" and "use of cruise control assist". The "usage situation" field stores the usage situation determined by usage situation determination portion 10, which will be described later. The other fields each store the utilization rate of a corresponding one of the functions to the total usage time of the vehicle in that usage situation (the percentage of the usage time of a corresponding one of the functions with respect to the total usage time of the vehicle). Note that the function usage time portion a period of time during which all the in-vehicle electronic devices required for implementing a function are set in the normal mode.

The power supply status DB 53 shown in FIG. 5, for example, indicates that, in the first record, the utilization rate of the VICS function is "10%" and the utilization rates of the other functions are "0%" when the usage situation is "commute".

In addition, the power supply status DB 53 shown in FIG. 5, for example, indicates that, in the third record, the utilization rates of the radio function, VICS function and information search function are respectively "50%", "10%" and "30%" and the utilization rates of the other functions are "0%" when the usage situation is "commute".

Note that the power supply status DB 53 stores the utilization rates of the respective functions in the present embodiment; instead, the power supply status DB 53 may store the utilization rates of the respective electronic devices.

Figure 6:
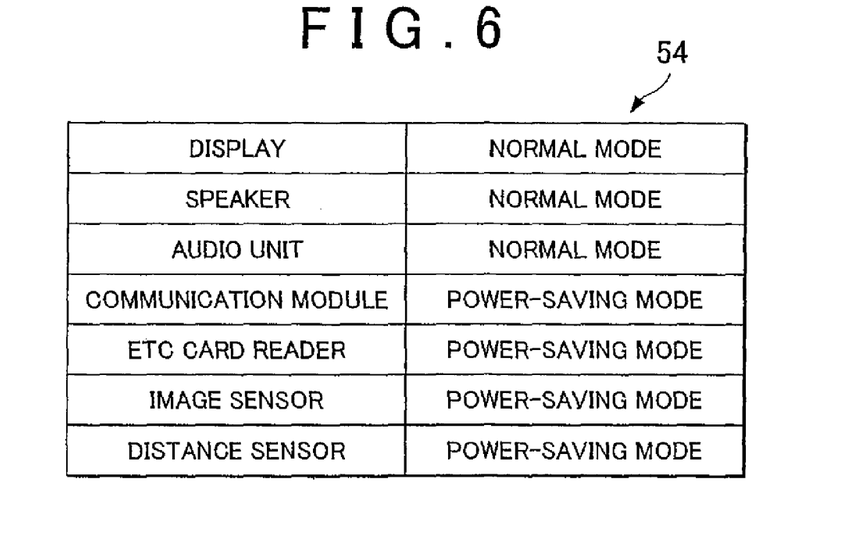
FIG. 6 is a view that shows an example of a device status map.

The device status map 54 is a map that shows a current power supply status to each of the various in-vehicle electronic devices. The device status map 54 is, for example, updated by the control unit 1 of the power-saving system 100 each time the power supply status to each of the various in-vehicle electronic devices changes, and stores which one of the normal mode, the power-saving mode, and the like, the power mode of each of the various in-vehicle electronic devices is.

FIG. 6 is a view that shows an example of the device status map 54, and shows a state where the display 20, the speaker 21 and the audio unit 22 are set in the normal mode and the other various in-vehicle electronic devices are set in the power-saving mode.

Next, various portions of the control unit 1 of the power-saving system 100 will be described.

The usage situation determination portion 10 is used to determine the usage situation of the vehicle, which is the integrated system. The usage situation determination portion 10, for example, identifies a place and a date and time, at which an engine is started, on the basis of the outputs from the location detecting unit 2 and time detecting unit 3. The usage situation determination portion 10 determines that the usage situation is "commute" when the date and time falls within a specified time period in a weekday, and determines that the usage situation is "recreation" when the date and time falls within a holiday or a day off.

Furthermore, the usage situation determination portion 10 may identify a driver on the basis of, the result authenticated by the personal authentication unit 4 to thereby determine the usage situation on the basis of a date and time, a place and the driver.

In addition, the usage situation determination portion 10 may determine the usage situation on the basis of the positional information of a destination or the name of a facility when the driver inputs the destination to the navigation system through a touch panel, a microphone or a remote controller.

In this case, the usage situation determination portion 10 determines that the usage situation is "commute" when the name of the facility of the destination is a company name for which the driver works, determines that the usage situation is "business" when the name of the facility of the destination is a related company, client company, customer, or the like, of the company for which the driver works, and determines that the usage situation is "recreation" when the name of the facility of the destination is a department store, a shopping center, an amusement park, or the like. Note that the power-saving system 100 has a database in the storage unit 50. The database stores information related to the company for which the driver works, the customer, the related company, and the like.

Furthermore, the usage situation determination portion 10 monitors movement of the vehicle on the basis of the outputs from the location detecting unit 2 and time detecting unit 3. It is also applicable that, when the usage situation determination portion 10 has detected that a series of actions that the engine is started at a first specified location (for example, a home) and the engine is stopped at a second specified location (for example, a place of work) in a specified time period in a weekday is repeated a predetermined number of times, the usage situation determination portion 10 assumes that the first specified location is a home and the second specified location is a place of work for which the driver works, and the usage situation determination portion 10 determines that the situation that the vehicle is used between the first specified location and the second specified location is "commute".

Furthermore, in this case, the usage situation determination portion 10 may automatically acquire the name of the company for which the driver works, a related company, affiliated company, customer, and the like, of that company on the basis of map information in the navigation system or various pieces of information held in the communication center. This is to make it possible to further flexibly determine the usage situation.

In addition, the usage situation determination portion 10 desirably determines the usage situation at the time when the vehicle starts traveling. However, when it is impossible to determine the usage situation yet on the basis of information usable at that time, the usage situation determination portion 10 may once set the usage situation to "undefined" and then may determine the usage situation at the time when new information (for example, a traveled route) is acquired. In this case, the usage situation determination portion 10 may apply the determined usage situation retroactively to when the vehicle has started traveling. This is to effectively utilize information related to the utilization rates of various functions in a period during which the usage situation is "undefined".

The power supply status control portion 11 is used to control the power supply status to each of the various in-vehicle electronic devices. The power supply status control portion 11, for example, refers to the function-device correspondence map 51 and function-situation correspondence map 52 stored in the storage unit 50 at the time when the usage situation can be determined by the usage situation determination portion 10, and then sets the in-vehicle electronic devices, corresponding to the determined usage situation, in the normal mode.

In addition, when the power supply status control portion 11 has switched the power modes of the respective in-vehicle electronic devices, the power supply status control portion 11 rewrites the values of the device status map 54 to update the current power supply status to each of the in-vehicle electronic devices.

The power supply status recording portion 12 is used to monitor and record the power supply status to each of the various in-vehicle electronic devices. The power supply status recording portion 12, for example, measures the durations of the normal modes of the respective various in-vehicle electronic devices while referring to the device status map 54, and acquires the function usage time of each of various functions implemented by a combination of the plurality of in-vehicle electronic devices on the basis of the measured result and the function-device correspondence map 51 to thereby calculate the utilization rate (the percentage of the function usage time with respect to a driving duration) function by function.

Furthermore, the power supply status recording portion 12 holds the utilization rates of the respective functions in the RAM while updating the utilization rates at a predetermined interval, and records those utilization rates of the respective functions, held in the RAM, in the power supply status DB 53 (see FIG. 5) at a predetermined timing (for example, when an ignition is turned off).

In addition, the power supply status recording portion 12 may generate information related to the use of each function or each in-vehicle electronic device on the basis of the output from the information acquisition unit 5, and may record the generated information in the power supply status DB 53 in addition to or instead of the utilization rates of the various functions.

Specifically, the power supply status recording portion 12 may monitor movement of the line of sight of the driver on the basis of images recorded by the vehicle interior camera while counting the frequency at which the driver looks at the display 20 (on which map information is displayed), and then may record the frequency as information related to the use of the display 20.

By so doing, the power supply status recording portion 12 is able to acquire the further substantial utilization rate (not the utilization rate based on a period of time during which the display 20 is set in the normal mode, but the utilization rate based on a period of time during which the driver actually looks at the display 20) of the display 20 or a function that requires the display 20 (for example, route guidance function).

In addition, the power supply status recording portion 12 may record input operation of the driver to the various in-vehicle electronic devices through a touch panel or a remote controller as the information related to the use of each of the various in-vehicle electronic devices.

The power supply status learning portion 13 is used to determine the power supply status to each of the various in-vehicle electronic devices in each usage situation in the future on the basis of the power supply status to each of the various in-vehicle electronic devices or the use of each function in each usage situation, recorded in the past. The power supply status learning portion 13, for example, analyzes the use of each function, stored in the power supply status DB 53, by usage situations and then updates the content of the function-situation correspondence map 52.

Specifically, the power supply status learning portion 13 summarizes and analyzes three records related to the usage situation "commute", stored in the power supply status DB 53 shown in FIG. 5, and then acquires the fact that the average of the field "use of VICS" is "6.7%".

In this case, the power supply status learning portion 13 determines that the utilization rate of the VICS function is low in the past usage situation "commute", and then switches the in-vehicle electronic devices for implementing the VICS function to the power-saving mode in the usage situation "commute" in the future. Note that, when any one of the in-vehicle electronic devices, which are supposed to be switched to the power-saving mode, is set in the normal mode for implementing a function other than the VICS function, the power supply status learning portion 13 maintains the power mode of that in-vehicle electronic device in the normal mode. This is to prevent a situation that the function other than the VICS function enters a non-operation state.

For example, when the power supply status learning portion 13 refers to the function-situation correspondence map 52 shown in FIG. 3 and then recognizes that only the VICS function is in an operation state in the usage situation "commute", the power supply status learning portion 13 rewrites the value "O" of the function "VICS", corresponding to the usage situation "commute" in the function-situation correspondence map 52 shown in FIG. 3, into "-" so that the VICS function is in a non-operation state in the next usage situation "commute" on the basis of the above analysis result that the utilization rate of the VICS function is low.

In this case, the power supply status learning portion 13 refers to the function-device correspondence map 51 shown in FIG. 2 to recognize the in-vehicle electronic devices (the display 20, the speaker 21 and the audio unit 22) that are set in the normal mode for implementing the VICS function, and, in addition, refers to the function-device correspondence map 51 and the function-situation correspondence map 52 while checking that the in-vehicle electronic devices are not set in the normal mode for implementing another function.

Then, the power supply status learning portion 13 switches the power modes of those in-vehicle electronic devices; except the in-vehicle electronic devices that are set in the normal mode for implementing another function, into the power-saving mode. For example, if the function "radio" is in an operation state in addition to the function "VICS" in the usage situation "commute", the speaker 21 and the audio unit 22 are set in the normal mode for implementing the function "radio" in addition to the function "VICS". Therefore, the power supply status learning portion 13 switches only the display 20, which is not shared, into the power-saving mode.

Note that the power supply status learning portion 13 updates the content of the function-situation correspondence map 52 so that the in-vehicle electronic devices in the normal mode are switched into the power-saving mode in the above described example; instead, the power supply status learning portion 13 may update the content of the function-situation correspondence map 52 so that the in-vehicle electronic devices in the power-saving mode into the normal mode.

In addition, the power supply status learning portion 13 may automatically generate a new usage situation different from the existing usage situations by combining records having similar characteristics on the basis of the information related to the use of the integrated system in the usage situation "undefined" stored in the power supply status DB 53, and then may add a column, corresponding to the newly generated usage situation, to the function-situation correspondence map 52.

In addition, when the content of the function-situation correspondence map 52 is updated by the power supply status learning portion 13, the control unit 1 may notify the user of the updated content. For example, when the function "information search", which has been in an operation state in the usage situation "commute", is updated by the power supply status learning portion 13 into a non-operation state, and when it is determined by the usage situation determination portion 10 that the usage situation is "commute" for the first time in the usage of the vehicle thereafter, the control unit 1 may notify the driver of the updated content by causing the display 20 to display a text message "the information search function is not likely to be used, so the information search function is set in the power-saving mode" or causing the speaker 21 to output a voice message of the same content.

Figure 7:
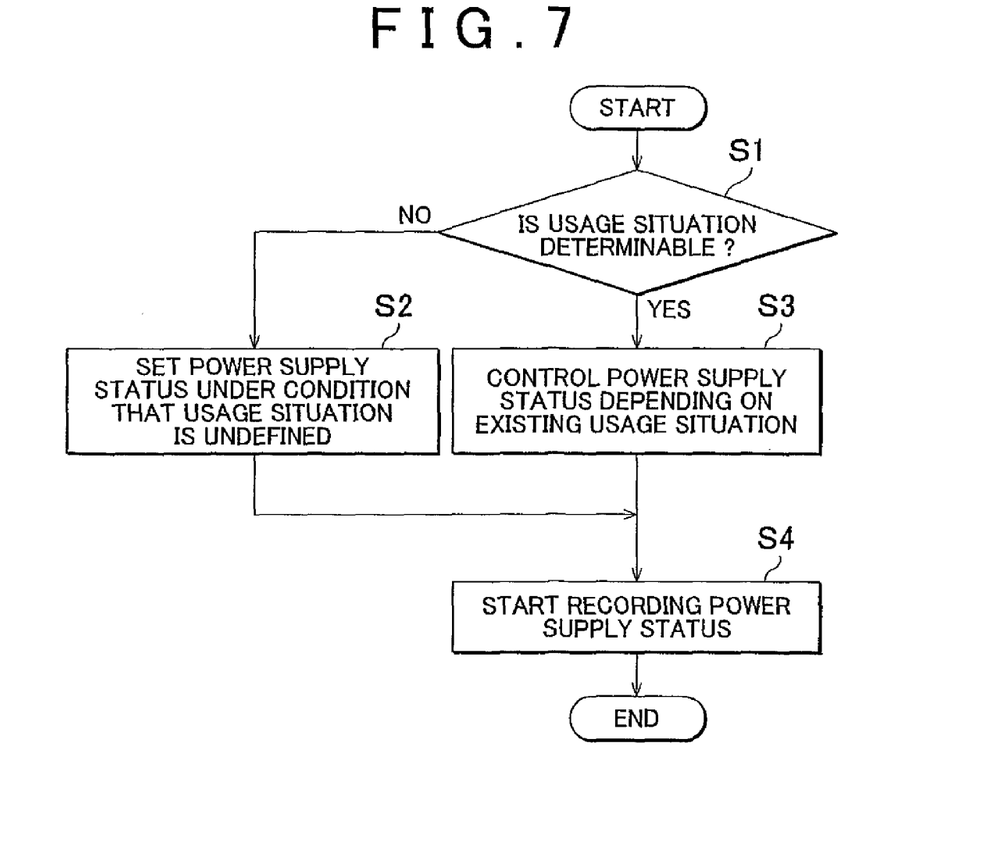
FIG. 7 is a flowchart that shows the flow of power supply status control process.

Next, the process in which the power-saving system 100 controls the power supply status to each of the various in-vehicle electronic devices (hereinafter, referred to as "power supply status control process") will be described with reference to FIG. 7. Note that FIG. 7 is a flowchart that shows the flow of the power supply status control process. It is assumed that the control unit 1 of the power-saving system 100 executes the power supply status control process repeatedly at a predetermined interval until the vehicle usage situation can be determined.

Initially, the control unit 1 uses the usage situation determination portion 10 to determine the vehicle usage situation on the basis of the output from the location detecting unit 2, the time detecting unit 3, the personal authentication unit 4 or the information acquisition unit 5 (step S1).

When it is impossible to determine the vehicle usage situation, the control unit 1 uses the power supply status control portion 11 to refer to the function-device correspondence map 51 (see FIG. 2) and the function-situation correspondence map 52 (see FIG. 3) that are stored in the storage unit 50, and then causes the in-vehicle battery or the generator to supply power to the in-vehicle electronic devices so that the power mode of each of the various in-vehicle electronic devices for causing the functions (all the functions in the integrated system in the present embodiment) corresponding to the usage situation "undefined" to enter an operation state becomes the normal mode (step S2).

On the other hand, when the vehicle usage situation can be determined, the control unit 1 uses the power supply status control portion 11 to refer to the function-device correspondence map 51 (see FIG. 2) and the function-situation correspondence map 52 (see FIG. 3) that are stored in the storage unit 50, and then causes the in-vehicle battery or the generator to supply power to the in-vehicle electronic devices so that the power mode of each of the various in-vehicle electronic devices for causing the functions, corresponding to the determined usage situation, to enter an operation state becomes the normal mode (step S3).

After that, the control unit 1 uses the power supply status recording portion 12 to start monitoring the power supply status to each of the various in-vehicle electronic devices while referring to the device status map 54 (see FIG. 6) and to start recording the power supply status into the power supply status DB 53 (see FIG. 5) (step S4).

Note that the power supply status control portion 11 updates the device status map 54 (see FIG. 6) each time the power mode of each of the various in-vehicle electronic devices is switched.

Figure 8:
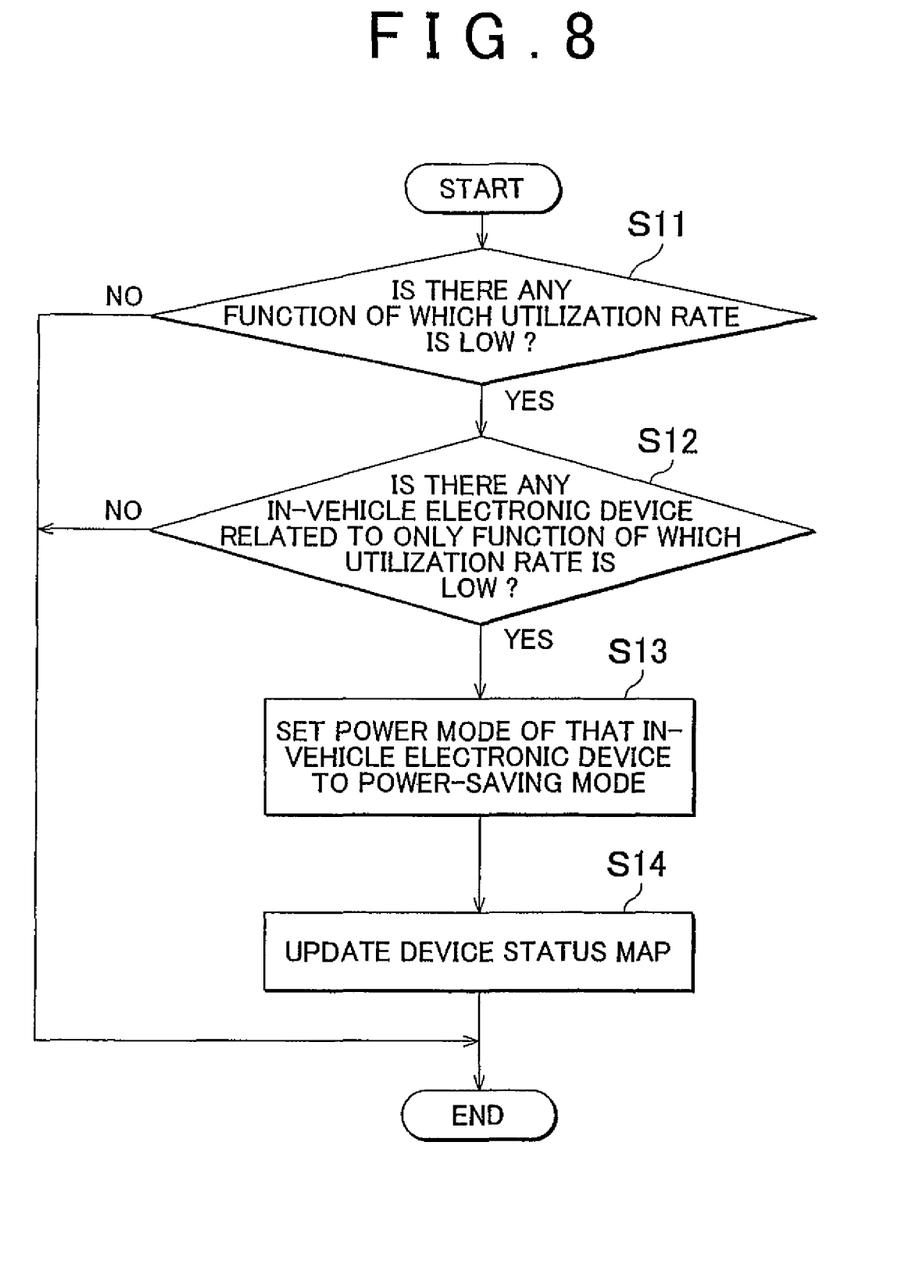
FIG. 8 is a flowchart that shows the flow of function-situation correspondence map updating process.

Next, the process in which the power-saving system 100 updates the function-situation correspondence map 52 (hereinafter, referred to as "function-situation correspondence map updating process") will be described with reference to FIG. 8. Note that FIG. 8 is a flowchart that shows the flow of the function-situation correspondence map updating process. The control unit 1 of the power-saving system 100 may execute the function-situation correspondence map updating process at a predetermined timing (for example, when the engine is started, and before the power supply status control process is started), may execute the function-situation correspondence map updating process when a predetermined amount of data are stored in the power supply status DB 53 (see FIG. 5), or may execute the function-situation correspondence map updating process in response to a user's request.

Initially, the control unit 1 uses the power supply status learning portion 13 to summarize and analyze the utilization rates of the functions in the respective usage situations recorded in the past by referring to the power supply status DB 53 (see FIG. 5) stored in the storage unit 50, and then determines whether there is a function of which the utilization rate is lower than a threshold (for example, lower than 10%) (step S11).

When there is no function of which the utilization rate is lower than the threshold (NO in step S11), the power supply status learning portion 13 ends the function-situation correspondence map updating process without updating the function-situation correspondence map 52. This is because it is possible to determine that the content of the current function-situation correspondence map 52 agrees to the power supply status in each of the past driving situations.

On the other hand, when there is a function of which the utilization rate is lower than the threshold (YES in step S11), the power supply status learning portion 13 determines whether there is an in-vehicle electronic device that is related to only the function of which the utilization rate is lower than the threshold by referring to the function-device correspondence map 51 (see FIG. 2) and the function-situation correspondence map 52 (see FIG. 3) (step S12).

When there is no in-vehicle electronic device related to only the function of which the utilization rate is lower than the threshold (NO in step S12), the power supply status learning portion 13 ends the function-situation correspondence map updating process without updating the function-situation correspondence map 52. This is because, although the content of the current function-situation correspondence map 52 does not completely agree to the power supply status in each of the past driving situations, it is necessary to prevent a situation that a function (hereinafter, referred to as "conflicting function") of which the utilization rate is higher than or equal to the threshold also cannot be implemented by setting the in-vehicle electronic devices (hereinafter, referred to as "shared device") related to both the function of which the utilization rate is lower than the threshold and the function of which the utilization rate is higher than or equal to the threshold in the power-saving mode.

Note that even in the above case, when the percentage of relationship of that shared device (for example, the percentage of relationship in the shared device between three functions of which the utilization rate is lower than the threshold and one function of which the utilization rate is higher than or equal to the threshold is 25%) is lower than a threshold (for example, lower than 30%, that is, the shared device is shared between three functions of which the utilization rate is lower than the threshold and one function of which the utilization rate is higher than or equal to the threshold), the power supply status learning portion 13 may further tighten a threshold for determining whether the utilization rate of the conflicting function is low (for example, 10% is changed to 20%), and, when it is possible to determine that the utilization rate of the conflicting function is low through second determination, the power supply status learning portion 13 may set the conflicting function in a non-operation state.

On the other hand, when there is an in-vehicle electronic device related to only the function of which the utilization rate is lower than the threshold (YES in step S12), the power supply status learning portion 13 updates the function-situation correspondence map 52 (see FIG. 3) so that the power mode of that in-vehicle electronic device becomes the power-saving mode (step S13), and updates the device status map 54 (see FIG. 6) after the power mode of that in-vehicle electronic device is actually set in the power-saving mode (step S14), and then ends the function-situation correspondence map updating process.

Note that the above described function-situation correspondence map updating process is applied when the in-vehicle electronic device that is related to the function of which the utilization rate is low and that is supposed to be started in the normal mode is switched so as to be started in the power-saving mode; instead, the function-situation correspondence map updating process may be applied when the in-vehicle electronic device that is related to the function of which the utilization rate is high and that is supposed to be started in the power-saving mode is switched so as to be started in the normal mode.

Figure 9:
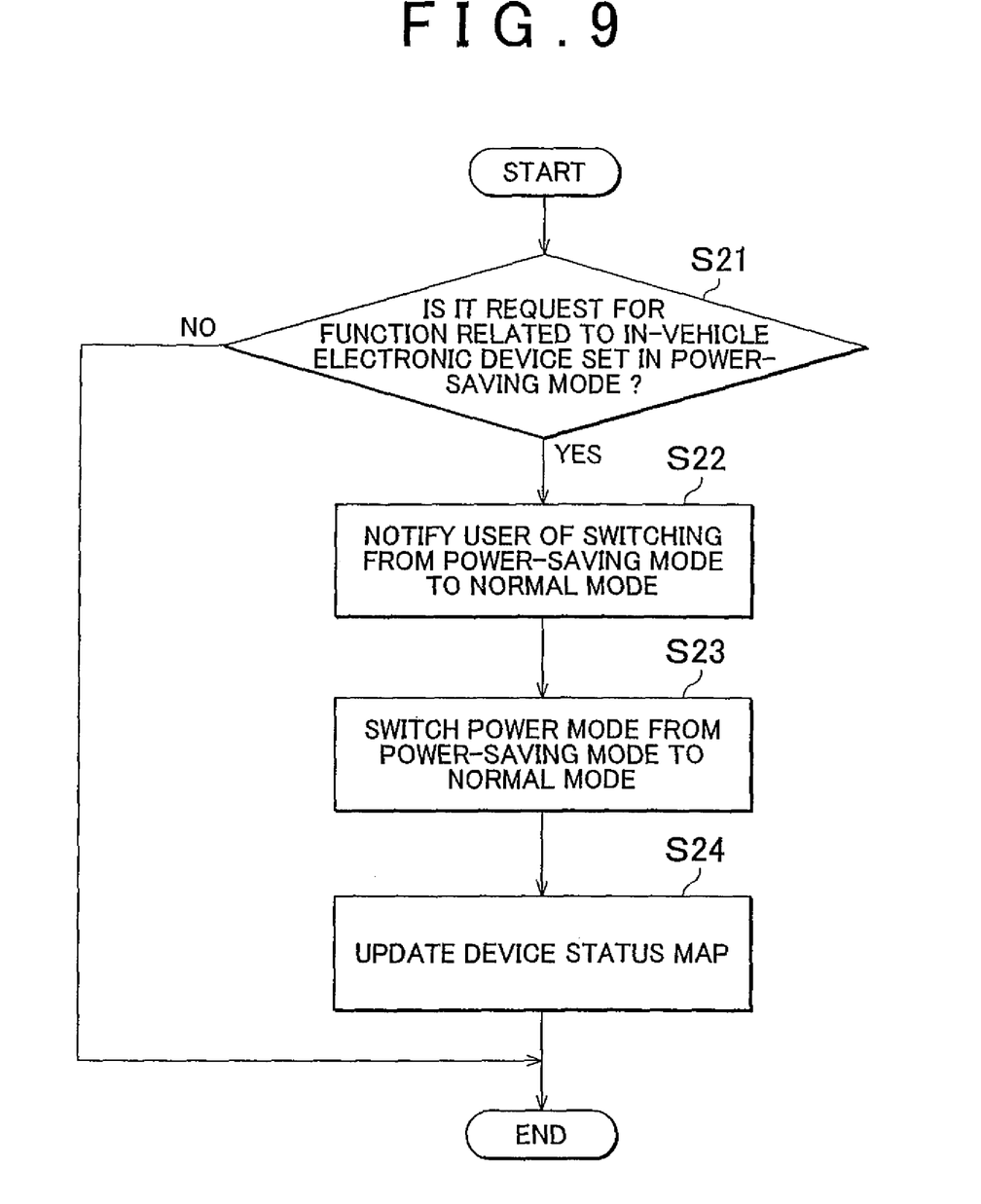
FIG. 9 is a flowchart that shows the flow of operating status recovery process.

Next, the process in which the power-saving system 100 switches the function in an non-operation state into an operation state (hereinafter, referred to as "operation state recovery process") will be described with reference to FIG. 9. Note that FIG. 9 is a flowchart that shows the flow of the operation state recovery process. The control unit 1 of the power-saving system 100 executes the operation state recovery process when the control unit 1 accepts an input to the integrated system by the user through the information acquisition unit 5.

Initially, the control unit 1 determines whether the accepted input is intended for the function related to the in-vehicle electronic device in the power-saving mode (function in a non-operation state) (step S21).

When the accepted input is not intended for the function in a non-operation state (NO in step S21), the control unit 1 directly ends the operation state recovery process.

On the other hand, when the accepted input is intended for the function in a non-operation state (YES in step S21), the control unit 1 notifies the user that the function in a non-operation state is recovered to an operation state.

In this case, the control unit 1 temporarily sets the display 20 or the speaker 21 in the normal mode when the display 20 or the speaker 21 is in the power-saving mode, or, when the display 20 or the speaker 21 is in the normal mode, the control unit 1 outputs the text message or voice message that the function in a non-operation state is recovered to an operation state to the user in the current mode (step S22).

In addition, the control unit 1 may calculate the amount of power saved by keeping a specified function in a non-operation state on the basis of a period of time during which the specified function is in a non-operation state, and then may notify the user of the amount of power saved, the amount of gasoline saved, the emission of carbon dioxide reduced, or the like, in addition to the above notification. This is to notify the user of the power-saving effect to prompt the user to further save power, and to ease uncomfortable feeling that a recovery period of time, required for recovering the function in a non-operation state to an operation state, gives the user.

After that, the control unit 1 uses the power supply status control portion 11 to switch the power mode of the in-vehicle electronic device related to the function in a non-operation state from the power-saving mode to the normal mode (step S23), and then updates the device status map 54 (see FIG. 6) (step S24). Thereafter, the control unit 1 ends the operation state recovery process.

With the above configuration, the power-saving system 100 according to the present embodiment sets the power supply status to each of the various in-vehicle electronic devices by usage situations of the vehicle in advance, and controls the power supply status to each of the in-vehicle electronic devices depending on a current usage situation. Thus, it is possible to save electricity while flexibly handling a case where the use of each of the various in-vehicle electronic devices changes by a large amount depending on a usage situation.

In addition, the power-saving system 100 records and analyzes the power supply status to each of the various in-vehicle electronic devices in each usage situation, and learns an optimal power supply status to each of the various in-vehicle electronic devices in each of the usage situations in the future to thereby update a map that represents the correspondence relationship between a vehicle usage situation and functions used in the usage situation. Thus, it is possible to save electricity while flexibly handling a case where the use of each of the various in-vehicle electronic devices in each usage situation changes over time.

In addition, the power-saving system 100 records and analyzes the power supply status to each of the various in-vehicle electronic devices in each usage situation, and switches the power mode of the in-vehicle electronic device of which the utilization rate is low into the power-saving mode. Thus, it is possible to save electricity while flexibly handling a case where the utilization rate of each of the various in-vehicle electronic devices in each usage situation is low.

The power-saving system according to the above described embodiment is an in-vehicle system that controls the power supply status to each of the various in-vehicle electronic devices depending on a usage situation of the vehicle; instead, the power-saving system may be applied to a system that controls the power supply status to each of various electronic devices equipped for another mobile unit, such as a cellular phone, depending on a usage situation of the mobile unit.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A power-saving system that saves electricity while comprehensively controlling the power supply status to each of a plurality of electronic devices equipped for an integrated system, comprising:
a power supply status control portion that controls the power supply status to each of the plurality of electronic devices depending on a usage situation of the integrated system;
a storage unit; and
a usage situation determination portion that determines the usage situation of the integrated system on the basis of information related to the use of the integrated system, including information related to a usage date and time or current location of the integrated system, wherein
the power supply status control portion controls the power supply status to each of the plurality of electronic devices on the basis of a predetermined power supply status to each of the plurality of electronic devices set depending on the usage situation of the integrated system and the usage situation determined by the usage situation determination portion, the storage unit stores a function-device correspondence map, a function-situation correspondence map, or a situation-device correspondence map that combines the function-device correspondence map with the function-situation correspondence map, a power supply status database, and a device status map, the function-device correspondence map is a map that represents the correspondence relationship between a function provided by the integrated system and a combination of various in-vehicle electronic devices required for implementing the function, and indicates whether a corresponding in-vehicle electronic device is set in a normal mode, or is set in a power-saving mode, the function-situation correspondence map is a map that shows a correspondence relationship between a vehicle usage situation and a function used in each usage situation, and indicates usage situations and various functions, wherein values in the map mean that the corresponding function is set in an operation state, or is set in a non-operation state or in a limited operation state, the situation-device correspondence map shows the correspondence relationship between a vehicle usage situation and various in-vehicle electronic devices required for implementing the functions used in the usage situation, wherein values in the situation-device correspondence map mean that the corresponding in-vehicle electronic device is set in the normal mode, or is set in the power-saving mode, the power supply status database is a database that systematically stores the use of each of monitored various functions so as to be searchable for each of the usage situations of the vehicle, and the device status map is a map that shows a current power supply status to each of the various in-vehicle electronic devices.

2. The power-saving system according to claim 1, further comprising:

a power supply status recording portion that monitors the power supply status to each of the plurality of electronic devices, and that records the power supply status to each of the plurality of electronic devices for each usage situations determined by the usage situation determination portion; and a power supply status learning portion that derives the use of each of the plurality of electronic devices in each usage situation on the basis of the power supply status recorded by the power supply status recording portion, and that updates the predetermined power supply status to each of the plurality of electronic devices set for each of the usage situations on the basis of the use of the integrated system.

3. The power-saving system according to claim 2, wherein the power supply status learning portion sets the power supply status to the electronic device of which the utilization rate is low to the power supply status corresponding to a power-saving mode in which power consumption is saved.

4. The power-saving system according to claim 3, wherein in the power-saving mode, operation of the electronic device of which the utilization rate is low is suspended, while being on standby so as to be able to start up quickly when operation of the electronic device of which the utilization rate is low is required.

5. A power-saving system that saves electricity while comprehensively controlling the power supply status to each of a plurality of electronic devices equipped for an integrated system, comprising:

power supply status control means for controlling the power supply status to each of the plurality of electronic devices depending on a usage situation of the integrated system;

storage means; and usage situation determination means for determining the usage situation of the integrated system on the basis of information related to the use of the integrated system, including information related to a usage date and time or current location of the integrated system, wherein the power supply status control means controls the power supply status to each of the plurality of electronic devices on the basis of a predetermined power supply status to each of the plurality of electronic devices set depending on the usage situation of the integrated system and the usage situation determined by the usage situation determination means, the storage means stores a function-device correspondence map, a function-situation correspondence map, or a situation-device correspondence map that combines the function-device correspondence map with the function-situation correspondence map, a power supply status database, and a device status map, the function-device correspondence map is a map that represents the correspondence relationship between a function provided by the integrated system and a combination of various in-vehicle electronic devices required for implementing the function, and indicates whether a corresponding in-vehicle electronic device is set in a normal mode, or is set in a power-saving mode, the function-situation correspondence map is a map that shows a correspondence relationship between a vehicle usage situation and a function used in each usage situation, and indicates usage situations and various functions, wherein values in the map mean that the corresponding function is set in an operation state, or is set in a non-operation state or in a limited operation state, the situation-device correspondence map shows the correspondence relationship between a vehicle usage situation and various in-vehicle electronic devices required for implementing the functions used in the usage situation, wherein values in the situation-device correspondence map mean that the corresponding in-vehicle electronic device is set in the normal mode, or is set in the power-saving mode, the power supply status database is a database that systematically stores the use of each of monitored various functions so as to be searchable for each of the usage situations of the vehicle, and the device status map is a map that shows a current power supply status to each of the various in-vehicle electronic devices.

6. A control method for a power-saving system that saves electricity while comprehensively controlling the power supply status to each of a plurality of electronic devices equipped for an integrated system, comprising:

controlling the power supply status to each of the plurality of electronic devices depending on a usage situation of the integrated system;

determining the usage situation on the basis of information related to the use of the integrated system, including information related to a usage date and time or current location of the integrated system, and controlling the power supply status to each of the plurality of electronic devices on the basis of a predetermined power supply status to each of the plurality of electronic devices set depending on a usage situation and the determined usage situation, wherein a storage unit stores a function-device correspondence map, a function-situation correspondence map, or a situation-device correspondence map that combines the function-device correspondence map with the function-situation correspondence map, a power supply status database, and a device status map, the function-device correspondence map is a map that represents the correspondence relationship between a function provided by the integrated system and a combination of various in-vehicle electronic devices required for implementing the function, and indicates whether a corresponding in-vehicle electronic device is set in a normal mode, or is set in a power-saving mode, the function-situation correspondence map is a map that shows a correspondence relationship between a vehicle usage situation and a function used in each usage situation, and indicates usage situations and various functions, wherein values in the map mean that the corresponding function is set in an operation state, or is set in a non-operation state or in a limited operation state, the situation-device correspondence map shows the correspondence relationship between a vehicle usage situation and various in-vehicle electronic devices required for implementing the functions used in the usage situation, wherein values in the situation-device correspondence map mean that the corresponding in-vehicle electronic device is set in the normal mode, or is set in the power-saving mode, the power supply status database is a database that systematically stores the use of each of monitored various functions so as to be searchable for each of the usage situations of the vehicle, and the device status map is a map that shows a current power supply status to each of the various in-vehicle electronic devices.

* * * * *